(12) United States Patent
Pack et al.

(10) Patent No.: US 7,712,780 B2
(45) Date of Patent: May 11, 2010

(54) GAS GENERATOR WITH HYBRID SPRING

(75) Inventors: Wesley D. Pack, Leonard, MI (US);
David T. Schumann, Lenox, MI (US)

(73) Assignee: TK Holdings, Inc., Armada, MI (US)

(*) Notice: Subject to any disclaimer, the term of this patent is extended or adjusted under 35 U.S.C. 154(b) by 0 days.

(21) Appl. No.: 12/002,635

(22) Filed: Dec. 17, 2007

(65) Prior Publication Data
US 2008/0143090 A1    Jun. 19, 2008

Related U.S. Application Data

(60) Provisional application No. 60/875,302, filed on Dec. 15, 2006.

(51) Int. Cl.
*B60R 21/26* (2006.01)
(52) U.S. Cl. ........................... 280/741; 280/737
(58) Field of Classification Search .............. 280/737, 280/741
See application file for complete search history.

(56) References Cited

U.S. PATENT DOCUMENTS

| | | | | |
|---|---|---|---|---|
| 6,752,421 | B2* | 6/2004 | Khandhadia et al. | 280/741 |
| 2002/0000716 | A1* | 1/2002 | Chikaraishi et al. | 280/741 |
| 2003/0122355 | A1* | 7/2003 | Khandhadia et al. | 280/741 |
| 2006/0261584 | A1* | 11/2006 | Blackburn | 280/741 |
| 2007/0075534 | A1* | 4/2007 | Kelley et al. | 280/736 |
| 2007/0075536 | A1* | 4/2007 | Kelley et al. | 280/737 |

* cited by examiner

*Primary Examiner*—Toan C To
(74) *Attorney, Agent, or Firm*—L.C. Begin & Associates, PLLC.

(57) ABSTRACT

The present invention provides an inflator for an inflatable restraint system in an automobile, or more generally, a gas generator. The inflator includes an inflator body having a plurality of inflation apertures and defining a first combustion chamber wherein a first propellant charge is positioned. At least one annular spring containing a cushion is provided for maintaining the integrity of the shape of the propellant charge.

13 Claims, 2 Drawing Sheets

GAS GENERATOR WITH HYBRID SPRING

CROSS-REFERENCE TO RELATED APPLICATIONS

This application claims the benefit of U.S. Provisional Application Ser. No. 60/875,302 filed on Dec. 15, 2006.

TECHNICAL FIELD

The present invention relates generally to pyrotechnic gas generators for inflatable restraint devices, and more particularly to such a gas generator having at least one annular spring and a cushion contained within the annular spring.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators, while retaining optimal function, has long been a goal of automotive engineers.

Typical inflators are constructed having an elongate, disc, or other shaped metallic body. Because many inflators utilize pyrotechnic gas generant compounds to produce inflation gas for the associated airbag, the inflator structure is necessarily robust, making such inflators correspondingly heavy. An increasingly popular and useful inflator style uses multiple, selectively activated gas generant charges. In such systems, the multiple propellant beds disposed within the inflator body may be ignited either simultaneously or serially. Certain vehicle and occupant parameters may justify firing both propellant beds in the event of a crash. Other scenarios may be best addressed by firing only one of the propellant charges, or firing the charges sequentially, with a delay between the two events. In order to avoid sympathetic ignition of one charge during firing of the other, the combustion chambers must generally be fluidly isolated. The relatively large forces on the inflator generated by the combustion of pyrotechnics therein requires the internal partitions and other structural members of the inflator that fluidly isolate the charges to be relatively sturdy, further adding to the weight of the inflator.

Various schemes have developed for constructing sturdy, internally partitioned multi-chamber inflators. One approach involves inserting a partition into the interior of the inflator, then crimping or roll-forming the inflator body to retain the partition. This approach has proven effective, however, in many circumstances a heavier-duty/thicker inflator body must be used that will withstand the crimping and/or roll forming process. Such inflator bodies can be quite heavy, and the manufacturing process is relatively complicated given processing steps necessary to secure the internal partitions.

Other concerns include ensuring the integrity of the propellant charge within a single chamber inflator, or ensuring the integrity of the propellant charges within a multi-chamber inflator. By cushioning the propellant charge within the inflator body, the surface area of the related propellant charge(s) can be better controlled, thereby providing repeatability of performance with regard to inflator actuation and gas generation dynamics.

SUMMARY OF THE INVENTION

It is an object of the present invention to provide a gas generator having a spring/cushion combination provided at either or both ends of the propellant wafer stack, within the inflator, thereby providing an effective cushion relative to required drop testing now included in airbag system specifications. The spring/cushion combination may be incorporated in any type of gas generator that incorporates a gas generant charge, whereby the integrity of the shape of the charge is preserved or better maintained by the enhanced cushioning of the annular spring/cushion combination.

DETAILED DESCRIPTION OF PREFERRED EMBODIMENTS

Figure 1:
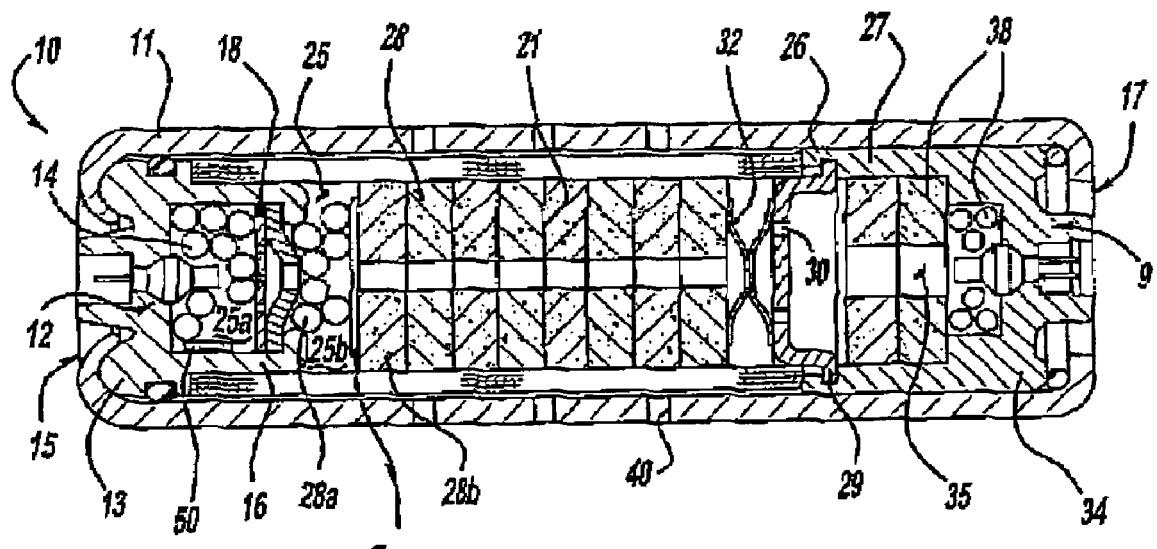
FIG. 1 is a partial side view of an inflator according to a preferred constructed embodiment of the present invention.

Referring to FIG. 1, there is shown a gas generator or inflator 10 according to a first embodiment. Inflator 10 is designed for use with an inflatable restraint system in an automobile, supplying inflation gas for inflation of a conventional airbag cushion, a function well known in the art. Exemplary inflator 10 utilizes two propellant charges, described herein, that are ignited in separate combustion chambers, and discharge inflation gas via a common plenum 21. Inflator 10 further provides independently operable initiators for igniting the respective propellant charges, imparting significant variation to the available operating schemes for the inflator. For instance, both sequential and serial firing of the two charges is possible, depending on the optimal deployment of the associated airbag. It is contemplated that inflator 10 will find greatest utility in passenger-side airbag systems; however, other applications are possible without departing from the scope of the present invention. All the components of the present invention are formed from known materials that are readily available commercially, and are made by known processes.

Inflator 10 includes a pressure vessel or inflator body 11, preferably a hollow steel cylinder. Inflator body 11 is characterized by a first end 15 and a second end 17, and defines a plurality of inflation apertures 40 that allow fluid communication between the exterior of the inflator body and plenum 21. A first end closure 13 is positioned at first end 15 of inflator body 11, preferably creating a fluid seal therewith. A second end closure 34 is preferably positioned at second end 17, also preferably creating a fluid seal with inflator body 11. Closures 13 and 34 are preferably metallic, however, they might be made from another suitable material such as a plastic, a ceramic, or a composite material. First end 15 and second end 17 are preferably crimped inwardly to hold first and second closures 13 and 34 in place, however, some other suitable method such as welding or mating threads on inflator body 11 and the respective closures might be used. In addition, rubber O-rings may be snap-fit around closures 13 and 34, creating or enhancing seals with inflator body 11.

Inflator 10 includes a first combustion chamber 25, within which a quantity of gas generant material or first propellant charge 28 is placed. In a preferred embodiment, chamber 25 comprises a significant proportion of the interior of inflator body 11, defined in part by longitudinal walls of inflator body 11, and in part by first end closure 13. Plenum 21 is the region of inflator body 11 whereby inflation gas is passed to apertures 40. Thus, chamber 25 and plenum 21 are at least partially coextensive. Stated another way, plenum 21 may be loosely defined as the portion of chamber 25 that occupies the middle region of the interior of inflator body 11. The phrase "at least partially coextensive" should be understood to include designs wherein chamber 25 is subdivided by foils, burst shims, etc., as described herein, as well as designs wherein chamber 25 is uninterrupted by such features. First end closure 13 preferably includes a cylindrical extension 16 wherein a perforated disk 18 is positioned, separating chamber 25 into two sub-chambers 25a and 25b. An initiator assembly 12, preferably including a conventional igniter or squib, is positioned at first end 15, and preferably mounted in first end closure 13 such that it can ignite compositions in chamber 25.

Propellant charge 28 may be any suitable gas generant composition known in the art, preferably a non-azide composition such as ammonium nitrate. Exemplary, but not limiting formulations are described in U.S. Pat. Nos. 5,872,329, 5,756,929, and 5,386,775. In a preferred embodiment, propellant charge 28 is provided in both tablet 28a and wafer 28b forms, both of which are illustrated in FIG. 1. The tablets 28a and wafers 28b maybe different compositions, bat are preferably the same material in different, commercially available forms. In a preferred embodiment a retainer disk 37 separates tablets 28a from wafers 28b. Disk 37 may be made from a relatively porous material such that a flame front or heat from ignition of tablets 28a can ignite wafers 28b, or it maybe made from a known material that allows ignition of wafers 28b by heat convection from the bunting of tablets 28a. A quantity of booster propellant 14 is preferably placed in sub-chamber 25a, and is ignitable via initiator 12 in a conventional manner to ignite and enhance the bum characteristics of the first propellant charge 28a and 28b.

A partitioning assembly 26 may be positioned proximate second end 17, and preferably comprises a substantially cylindrical base member 27 and a cap 29. Base member 27 and cap 29 define a second combustion chamber 35, that at least partially encases a second quantity of propellant 38, preferably in both tablet and wafer form. Base member 27 and second end closure 34 may be the same piece, as in one preferred embodiment, or a plurality of separate, attached pieces might be used. In a preferred embodiment, partitioning assembly 26 is formed structurally independent from inflator body 11. Partitioning assembly 26 is an independent piece having no physical attachment with the longitudinal sidewall of inflator body 11. During assembly of inflator 10, partitioning assembly 26 is slid into position in inflator body 11, and second end 17 is crimped inwardly to secure assembly 26 therein. Thus, other than securing second end closure 34, no modifications are made to inflator body 11 to accommodate or otherwise secure the components defining second combustion chamber 35.

Cap 29 preferably includes a plurality of apertures 30 that can connect second chamber 35 with plenum 21 (as well as first chamber 25, since plenum 21 and chamber 25 are fluidly connected and partially coextensive). In a preferred embodiment, a foil or burst shim (not shown) is placed across apertures 30 to block fluid communications between the two chambers. It should be appreciated, however, that the foil or burst shim is positioned and/or manufactured such that it will not burst inwardly, i.e. in the direction of second end 17 during combustion of propellant in chamber 25. Combustion of propellant in second chamber 35, on the other hand, is capable of bursting the foil or shim outwardly, allowing the combustion products in chamber 35 to escape to plenum 21/first chamber 25, and thereby discharge from inflator body 11. The preferred foils and shims, and the described methods of mounting them are all known in the art. By fluidly isolating first and second chambers 25 and 35, sympathetic ignition of the propellant in chamber 35 during combustion of the propellant in chamber 25 can be avoided, as described herein. The outer diameter of base member 27 is preferably substantially equal to the inner diameter of inflator body 11, such that base member 27 is nested therein, i.e. fits relatively snugly. Because both second end closure 34 and inflator body 11 are preferably substantially cylindrical, the two components are preferably axially aligned. One or more autoignition tablets 50 may be placed in inflator 10, allowing ignition of the gas generant materials upon external heating in a manner well known in the art.

In one embodiment wafers 28b, are positioned in a stack in plenum 21. A spring 32, preferably a conventional bell spring, is positioned adjacent the stack, and biases the entire stack toward first end 15. Wafers 28b, in turn, preferably bias disk 37 against tablets 28a, preventing tablets 28a from being jostled while the inflator is idle long periods, helping avoid mechanical degradation of tablets 28a.

Figure 3:
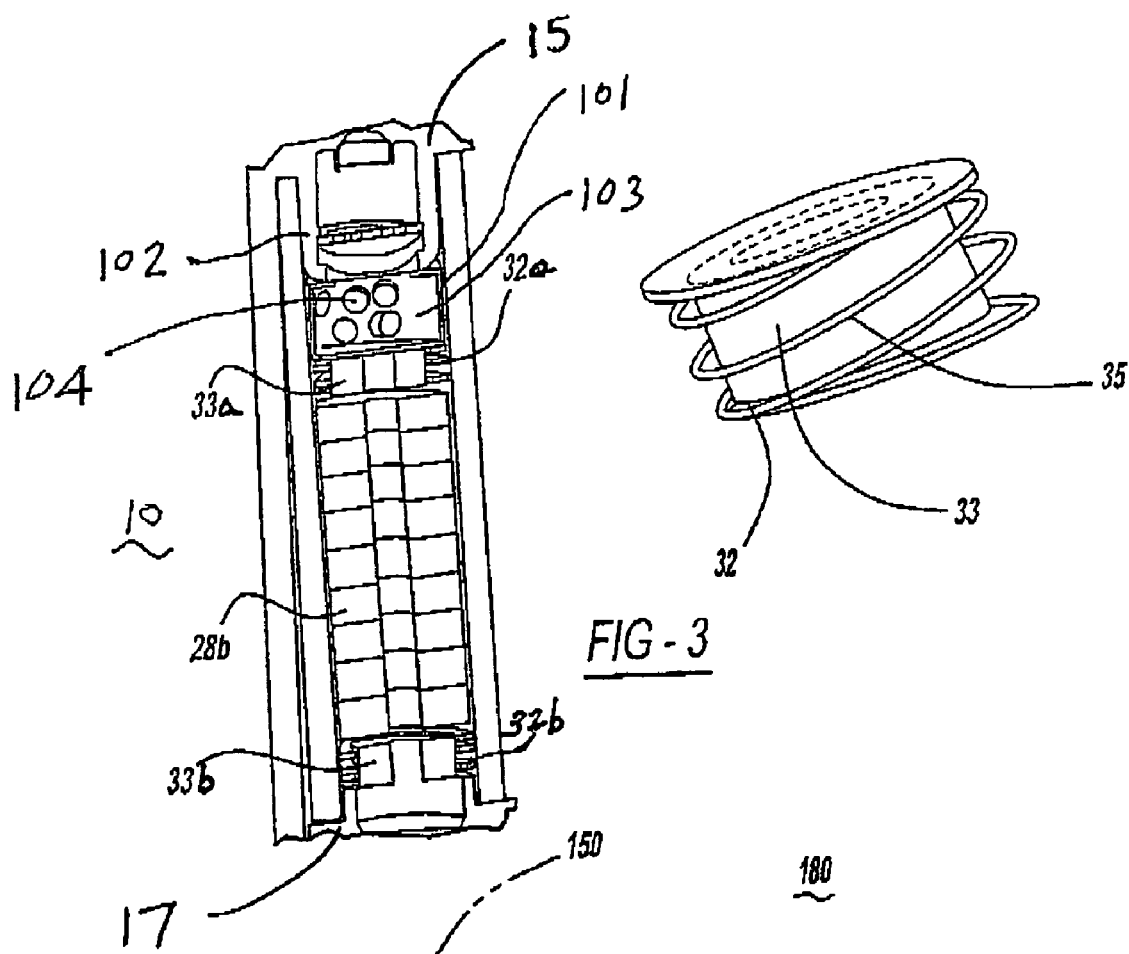
FIG. 3 is a view of the combination spring/cushion as employed at either or both ends of the exemplary inflator.

In accordance with yet another aspect of the present invention, spring 32 may alternatively be formed as a "wave" spring, wherein the spring 32 has an inside diameter (ID) typically four to six millimeters smaller than the outside diameter (OD), although this may vary with design. Nested within the ID is a ceramic cushion pressed into the ID. It should be appreciated that the design of the spring may vary, however, the spring should manage the load during initial compression, and the cushion should support the load during high compressive forces. FIG. 3 illustrates how the spring 32 and the cushion 33 are positioned at either or both ends of the inflator, and at either or both ends of the wafer or propellant charge 28b stack, thereby increasing the protection afforded by the spring/cushion combinations. The spring 32 may be provided by Anderson Spring for example.

In general, as shown in FIG. 3, a cup 101 abuts an end closure 102 secured in a first end 15 of the inflator 10. Cup 101 has a cavity 103 formed therein for containing tableted composition 104. A first annular spring member 32a is positioned between cup 101 and the propellant charge 28b for cushioning the propellant charge 28b. An annular region 35 is defined by the annular spring member 32a. A first cushion 33a, preferably a ceramic cushion, is positioned within the first annular spring member 32a for further cushioning of the propellant charge 28b. If desired, a second annular spring member 32b may be provided. The second annular spring member 32b is positioned between a second end 17 of the inflator 10 and the propellant charge 28b. A second cushion 33b may also be provided and positioned within the second annular spring member 32b for further cushioning of the propellant charge 28b. Although the ceramic cushion is illustrated, other types of cushions such as rubber (EPDM of other elastomers) cushions may be employed as well. The ceramic cushion is desired because of its ability to continue functioning at higher temperatures.

By combining the spring 32 and the cushion 33, the spring when biased against the gas generant charge can support the propellant during vibration and shield the cushion 33 from degradation due to contact with the propellant. During drop tests, or drop conditioning, the cushion 33 minimizes damage to the propellant 28b. The combination of the spring 32 and the cushion 33 improves the durability of the inflator/propellant system after drop testing. The ceramic cushion 33 may be provided by suppliers of ceramic products. Cushions may be provided by known suppliers such as Thermal Ceramics.

In a typical inflatable restraint system design, inflator 10 is connected to an electrical activation system that includes a crash sensor, of which there are many well-known suitable types. In addition, various sensing systems may be incorporated into the vehicle electronics, including seat weight sensors, occupant detection systems, etc. During a typical deployment scenario, an impact or a sudden vehicle deceleration, an activation signal is sent from an onboard vehicle computer to inflator 10. The signal may be sent to either or both of the initiator assemblies housed with inflator 10. Because chamber 25 preferably contains the larger, main charge, the activation signal is typically directed initially to the initiator assembly operably associated with first chamber 25. In certain scenarios, for example with larger occupants, or where occupants are out of a normal seated position in the vehicle, it may be desirable to activate both propellant charges simultaneously. Other scenarios may call for different activation schemes. For instance, certain conditions may make it desirable to fire only the first propellant charge, or sequentially fire both charges, with varying time delays between the two events. Once an electrical activation signal is sent to the initiator associated with first chamber 25, combustion of booster propellant 14 in sub-chamber 25a is initiated. The flame front and/or hot combustion gases from booster 14 subsequently traverse disk 18, initiating combustion of propellant tablets 28a in chamber 25b. The burning of tablets 28a produces inflation gas that flows rapidly out inflation apertures 40, initiating filling of an associated airbag.

A cylindrical, metallic mesh filter 16 is preferably positioned in inflator body 11, and filters slag produced by the combustion of the compounds therein, also serving as a heat sink to reduce the temperature of the inflation gas. Combustion of tablets 28a initiates combustion of wafers 28b, preferably made from the same or similar material as tablets 28a, providing a sustained burn that delivers a relatively constant supply of gas to the associated airbag via plenum 21 and apertures 40. When desired, an electrical activation signal is sent to the initiator operably associated with second chamber 35, containing a gas generant composition 38 that is preferably similar to the composition in chamber 25. Rapid creation of gas in chamber 35 causes a rapid rise in the gas pressure therein, outwardly bursting the foil or shim (not shown) that covers apertures 30, in cap 29. The gas is subsequently discharged from inflator 10 via plenum 21 and apertures 40. Activation of the gas generant in chamber 35 can take place before, during, or after an activation signal is sent to initiator assembly 12, operably associated with chamber 25.

Because both chambers 25 and 35 discharge inflation gas through plenum 21, this embodiment provides different operating advantages over many earlier designs wherein separate plenums are used for each combustion chamber. By discharging inflation gases from both combustion chambers 25 and 35 through plenum 21, the inflation profile characteristics across the length and width of an associated airbag can be improved as compared to earlier multi-chamber designs wherein the combustion chambers discharge via separate plenums. In addition, the use of a partitioning assembly structurally independent from the inflator body sidewalls allows the inflator to be constructed without crimping or otherwise modifying the inflator body itself. Moreover, because inflator 10 utilizes a plenum that is coextensive with a first of the combustion chambers, inflator 10 has a simpler design than multi-chamber inflators utilizing combustion chambers that are both partitioned from a common plenum. Inflator body 11 utilizes no attached internal partitions, and can therefore be manufactured without the need for strengthening to compensate for weakening caused by partition attachment. These and other advantages reduce the cost, manufacturing complexity, size and weight of the inflator.

Figure 2:
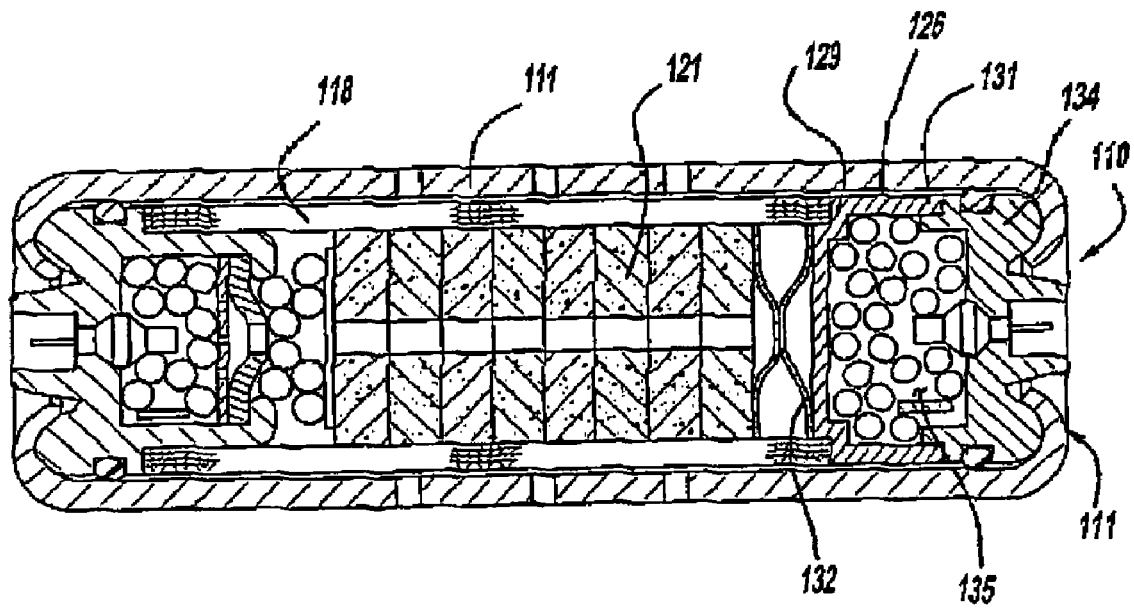
FIG. 2 is a partial side view of another inflator according to a preferred constructed embodiment of the present invention.

Referring now to FIG. 2, there is shown an inflator 110 according to a second embodiment of the present invention. Inflator 110 shares many features with previously described inflator 10, however, there are significant differences. Referring in particular to an end region 117 of inflator 110, included therein is a partitioning assembly 126. Partitioning assembly 126 includes a cap 129 that is preferably press-fit onto an end closure 134, in turn secured to an inflator body 111. Cap 129 and end closure 134 are both preferably metallic, however, they might be formed from some other material, for instance a polymer, without departing from the scope of the present invention. The outer diameter of cap 129 is preferably less than the inner diameter of inflator body 110 such that gas can flow through the gap between the two, as described herein. Cap 129 preferably includes a substantially cylindrical first portion 131 having a first diameter, and a substantially cylindrical second portion 132 having a second diameter that is less than said first diameter.

In one embodiment, a conventional metallic mesh filter 116 assembly engages cap 129, second portion 132 fitting inside an interior of filter 116, and first portion 131 abutting an end region of filter 116. Cap 129 and end closure 134 preferably fluidly isolate a combustion chamber 135 from the interior 121 of inflator body 111. Similar to the FIG. 1 embodiment, interior 121 of inflator body 11 serves as a common plenum for discharge of the inflation gases from the respective combustion chambers, and is at least partially coextensive with the first combustion chamber, also denoted 121. Upon ignition of gas generant in chamber 135, the rapid rise in gas pressure causes cap 129 to be displaced from its engagement with end closure 134, partially deforming metallic mesh filter 116. Cap 129 is preferably substantially cylindrical, and has an outer diameter slightly less than an inner diameter of inflator body 111. Therefore, when cap 129 is forced out of engagement with end closure 134, gas can flow through the gap between the outer periphery of cap 129, and the interior wall of inflator body 111. Subsequently, the gas flows into the interior 121 of inflator body 111, then through a plurality of apertures 140 into an associated airbag. In a preferred embodiment, propellant in chamber 135 is ignited in conjunction, simultaneously or sequentially, with propellant in chamber 121, similar to the operation of inflator 10.

Figure 4:
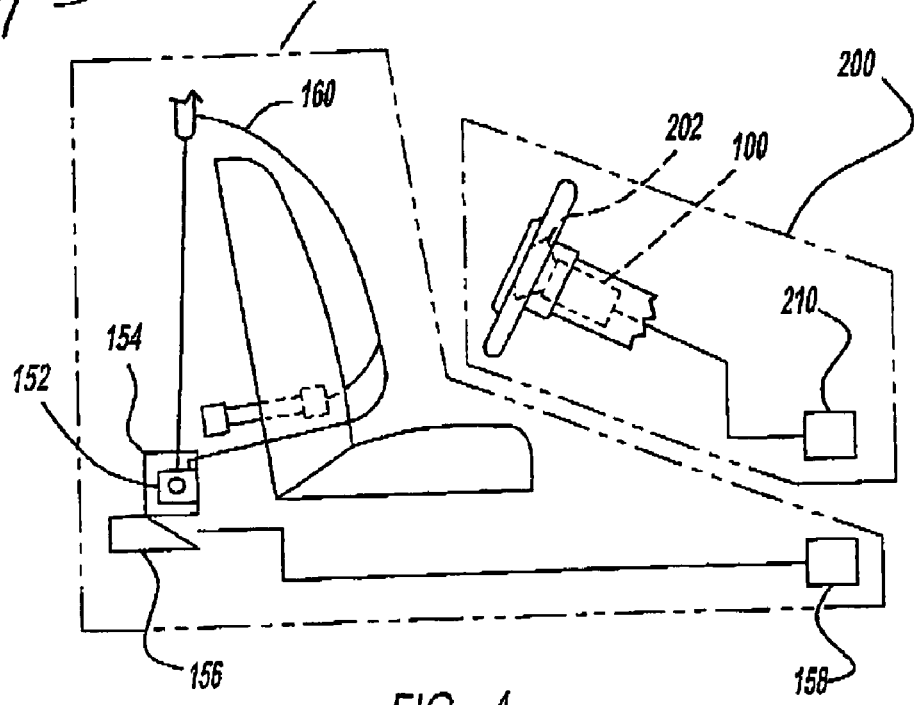
FIG. 4 is a schematic view of a vehicle occupant protection system in accordance with the present invention.

Referring now to FIG. 4, the exemplary inflator 10 described above may also be incorporated into an airbag system 200. Airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 4, airbag system 200 may also be incorporated into a broader, more comprehensive vehicle occupant restraint system 180 including additional elements such as a safety belt assembly 150. FIG. 4 shows a schematic diagram of one exemplary embodiment of such a restraint system. Safety belt assembly 150 includes a safety belt housing 152 and a safety belt 100 extending from housing 152. A safety belt retractor mechanism 154 (for example, &springloaded mechanism) maybe coupled to an end portion of the belt. In addition, a safety belt pretensioner 156 containing propellant 12 and autoignition 14 may be coupled to belt retractor mechanism 154 to actuate the retractor mechanism in the event of a collision. Typical seat belt refractor mechanisms which may be used in conjunction with the safety belt embodiments of the present invention are described in U.S. Pat. Nos. 5,743,480, 5,553,803, 5,667,161, 5,431,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

The present description is for illustrative purposes only, and should not be construed to limit the breadth of the present invention in any way. Thus, those skilled in the art will appreciate that various modifications could be made to the presently disclosed embodiments without departing from the intended spirit and scope of the present invention. For example, other gas generators having gas generant charges, such as a single stage driver side inflator (not shown), could also be provided with an annular spring and a cushion combined as described above. Other aspects, features and advantages will be apparent upon an examination of the attached drawing figures.

What is claimed is:

1. A gas generator comprising:
    an inflator body having a first end and a second end, said inflator body defining a first chamber wherein a first propellant charge is positioned;
    a first annular spring member positioned between said propellant charge and said second end for cushioning said propellant charge; and
    a first cushion positioned within said annular spring member for cushioning of said propellant charge.

2. The inflator of claim 1 wherein said first cushion is a ceramic cushion.

3. The inflator of claim 1 wherein said inflator further comprises:
    a second annular spring member positioned between said propellant charge and said first end for cushioning said propellant charge; and
    a second cushion positioned within said annular spring member for cushioning of said propellant charge.

4. The inflator of claim 1 wherein said annular spring is a wave spring.

5. A gas generator comprising:
    a housing;
    a propellant charge within said housing;
    an annular spring biased against said propellant charge for cushioning of said propellant charge, said annular spring defining an annular region; and
    a cushion fixed within said annular region of said annular spring for further protection of said propellant charge.

6. The gas generator of claim 5 wherein said cushion is ceramic.

7. The gas generator of claim 5 wherein said spring is a wave spring.

8. A vehicle occupant protection system containing the gas generator of claim 1.

9. A vehicle occupant protection system containing the gas generator of claim 5.

10. A gas generator comprising:
    an inflator body having a first end and a second end, said inflator body defining a first chamber wherein a first propellant charge is positioned;
    a cup for containment of a composition;
    a first annular spring member positioned between said propellant charge and said cup for cushioning said propellant charge; and
    a first cushion positioned within said annular spring member for cushioning of said propellant charge.

11. The gas generator of claim 1 wherein the spring member and the cushion are unattached to any other element of the gas generator.

12. The gas generator of claim 1 further comprising a cup for containment of a composition, wherein the cup is positioned between the first cushion and the inflator body second end.

13. The gas generator of claim 1 further comprising a plate interposed between the spring and the propellant charge, wherein the plate has no openings formed therein.

* * * * *

UNITED STATES PATENT AND TRADEMARK OFFICE
CERTIFICATE OF CORRECTION

PATENT NO. : 7,712,780 B2
APPLICATION NO. : 12/002635
DATED : May 11, 2010
INVENTOR(S) : Pack et al.

It is certified that error appears in the above-identified patent and that said Letters Patent is hereby corrected as shown below:

Column 3, Line 28, delete "maybe" and insert --may be--

Column 3, Line 28, delete "bat" and insert --but--

Column 3, Line 33, delete "maybe" and insert --may be--

Column 3, Line 35, delete "bunting" and insert --burning--

Column 3, Line 38, delete "bum" and insert --burn--

Column 6, Line 67, delete "&" and insert --a--

Column 7, Line 1, delete "maybe" and insert --may be--

Column 7, Line 5, delete "refractor" and insert --retractor--

Column 7, Line 8, delete "5,431,008" and insert --5,451,008--

Signed and Sealed this

Ninth Day of November, 2010

David J. Kappos
*Director of the United States Patent and Trademark Office*